US010996132B2

(12) United States Patent
Hilpert et al.

(10) Patent No.: US 10,996,132 B2
(45) Date of Patent: May 4, 2021

(54) METHOD FOR TESTING FOR FLUID LEAKS

(71) Applicant: Engip, LLC, Houston, TX (US)

(72) Inventors: Clifford Lee Hilpert, Conroe, TX (US); Jeffrey Hilpert, Conroe, TX (US)

(73) Assignee: ENgip, LLP, Conroe, TX (US)

( * ) Notice: Subject to any disclaimer, the term of this patent is extended or adjusted under 35 U.S.C. 154(b) by 0 days.

(21) Appl. No.: 16/419,999

(22) Filed: May 22, 2019

(65) Prior Publication Data

US 2019/0271611 A1  Sep. 5, 2019

Related U.S. Application Data

(63) Continuation of application No. 15/201,090, filed on Jul. 1, 2016, now Pat. No. 10,330,561, which is a continuation of application No. 14/932,727, filed on Nov. 4, 2015, now Pat. No. 10,267,705, and a continuation of application No. 15/151,323, filed on May 10, 2016.

(60) Provisional application No. 62/191,419, filed on Jul. 12, 2015, provisional application No. 62/140,795, filed on Mar. 31, 2015, provisional application No. 62/159,429, filed on May 11, 2015.

(51) Int. Cl.
*G01M 3/28* (2006.01)
*E21B 47/117* (2012.01)
*G01M 3/26* (2006.01)

(52) U.S. Cl.
CPC ......... *G01M 3/2876* (2013.01); *E21B 47/117* (2020.05); *G01M 3/28* (2013.01); *G01M 3/26* (2013.01); *G01M 3/2815* (2013.01)

(58) Field of Classification Search
CPC ........ G01M 3/2876; G01M 3/28; G01M 3/26; G01M 3/2815; E21B 47/1025
See application file for complete search history.

(56) References Cited

U.S. PATENT DOCUMENTS

| 5,090,234 A | 2/1992 | Maresca, Jr. et al. |
| 5,189,904 A | 3/1993 | Maresca, Jr. et al. |
| 6,328,542 B1 | 12/2001 | Serafin et al. |
| 6,631,634 B2 | 9/2003 | Cook et al. |
| 2003/0000693 A1 | 1/2003 | Couren et al. |
| 2005/0269079 A1 | 12/2005 | Franklin |
| 2007/0005250 A1 | 1/2007 | Davila |
| 2008/0185143 A1 | 7/2008 | Winters et al. |
| 2013/0031962 A1 | 2/2013 | Nandwani et al. |

(Continued)

OTHER PUBLICATIONS

International Search Report and Written Opinion for International Application No. PCT/US16/25315 dated Sep. 9, 2016.

(Continued)

*Primary Examiner* — Jonathan M Dunlap
(74) *Attorney, Agent, or Firm* — Tumey L.L.P.

(57) ABSTRACT

Blowout preventers, fluid pressure systems and portions thereof may be tested for leaks by calculating an Apparent Compressibility Factor which is determined during initial pressurization of the system to the test pressure. The equivalent decay rate is calculated by measuring the amount of intensifying fluid required to be added to maintain the system at the test pressure level. The equivalent decay rate in psi per minute is then compared to the acceptable decay rate for the pressure level of the test to determine if the system passed the test.

4 Claims, 1 Drawing Sheet

FIG. 2

(56) References Cited

U.S. PATENT DOCUMENTS

2013/0111985 A1 5/2013 Veeningen
2013/0311097 A1 11/2013 Livesay et al.

OTHER PUBLICATIONS

International Preliminary Report on Patentability for Application No. PCT/US16/025315 dated Oct. 12, 2017.
Non-Final Office Action for U.S. Appl. No. 14/932,727 dated May 31, 2017.
Non-Final Office Action for U.S. Appl. No. 14/932,727 dated Dec. 7, 2017.
Final Office Action for U.S. Appl. No. 14/932,727 dated Jul. 27, 2018.
Notice of Allowance for U.S. Appl. No. 14/932,727 dated Dec. 10, 2018.
USPTO Examiner's Response to Appeal Brief for U.S. Appl. No. 15/360,861 dated Jan. 23, 2019.
USPTO Corrected Notice of Allowance for U.S. Appl. No. 14/932,727 dated Mar. 26, 2019.
USPTO Issue Notification for U.S. Appl. No. 14/932,727 dated Apr. 3, 2019.
USPTO Non-Final Office Action for U.S. Appl. No. 15/151,323 dated Dec. 13, 2017.
USPTO Non-Final Office Action for U.S. Appl. No. 15/151,323 dated Jun. 28, 2017.
USPTO Final Office Action for U.S. Appl. No. 15/151,323 dated Jun. 28, 2018.
USPTO Examiner's Response to Appeal Brief for U.S. Appl. No. 15/151,323 dated May 29, 2019.
USPTO Corrected Notice of Allowance for U.S. Appl. No. 15/201,090 dated Mar. 19, 2019.
USPTO Notice of Allowance for U.S. Appl. No. 15/201,090 dated Feb. 15, 2019.
USPTO Issue Notification for U.S. Appl. No. 15/201,090 dated Jun. 5, 2019.
USPTO Non-Final Office Action for U.S. Appl. No. 15/201,090 dated Feb. 7, 2018.
USPTO Final Office Action for U.S. Appl. No. 15/201,090 dated Sep. 10, 2018.
Author: Unkown, Title: Technical Note 802—Leak Testing, Date: Jul. 2002, Publisher: Performance Pipe, Chevron Phillips Chemical Company LP, p. 5.
USPTO Non-Final Office Action for U.S. Appl. No. 15/360,861 dated Feb. 2, 2018.
USPTO Non-Final Office Action for U.S. Appl. No. 15/360,861 dated Jun. 29, 2017.
USPTO Non-Final Office Action for U.S. Appl. No. 15/797,087 dated Jun. 25, 2018.
USPTO Notice of Allowance for U.S. Appl. No. 16/247,683 dated Apr. 17, 2019.
USPTO Issue Notification for U.S. Appl. No. 16/247,683 dated Aug. 7, 2019.
Extended European Search Report for Application No. 16774217.0 dated Oct. 18, 2018.
USPTO Patent Board Decision for U.S. Appl. No. 15/360,861 dated Apr. 16, 2020.
European Patent Office Search and Examination Report for Application No. 16774217.0 dated Sep. 24, 2020.

METHOD FOR TESTING FOR FLUID LEAKS

CROSS-REFERENCE TO RELATED APPLICATIONS

This application is a continuation of U.S. application Ser. No. 15/201,090 filed Jul. 1, 2016 which claims priority to U.S. provisional application 62/191,419 filed Jul. 12, 2015 and is a continuation in part of U.S. application Ser. No. 15/151,323 filed May 10, 2016 which claims priority to provisional application 62/159,429 filed May 11, 2015. U.S. application Ser. No. 15/201,090 is also a continuation in part of application Ser. No. 14/932,727 filed Nov. 4, 2015 which claims priority to provisional application 62/140,795 filed Mar. 31, 2015.

The entire contents of the above identified provisional and non-provisional U.S. patent applications are expressly incorporated herein reference thereto.

BACKGROUND OF THE INVENTION

1. Field of the Invention

This application is directed to a method of testing a closed hydraulic system for example a blowout preventer (BOP) assembly for leaks. Oil and Gas Exploration risk management includes the ability to control subsurface pressure which may be encounted during drilling operation. The primary mechanism utilized by operators to control downhole pressure is the hydrostatic pressure as a result of the drilling fluid contained within the wellbore. The drilling fluid is engineered and formulated to a density that provides a hydrostatic pressure inside of the wellbore that is greater than the formation pressure being drilled. In the majority of drilling operations, the hydrostatic control is adequate. However, from time-to-time the operator may encounter a higher than expected formation pressure where there is not adequate hydrostatic pressure to control the wellbore pressure. During these times the operator relies on a series of mechanical controls to stabilize the wellbore and prevent a "Blow Out." A blow out is the uncontrolled release of fluid or gas from the wellbore. This event is extremely dangerous and therefore must be avoided if at all possible. The primary mechanical control device utilized by operators to control wellbore pressure is the Blowout Preventer (BOP) assembly. The BOP assembly consists of valves, and multiple sealing and shearing devices that are hydraulically actuated to provide various means of sealing around the drill string or shearing it off entirely, completely sealing the wellbore. It is essential that the BOP assembly operate as designed during these critical operations. Therefore it is a regulatory requirement to test the functionality and the integrity of the BOP assembly before starting drilling operations and at specific events during the drilling operations.

2. Description of Related Arts Invention

The BOP assembly test is a series of pressure tests at a minimum of two pressure levels, low pressure and high pressure. During the pressure test, fluid from a high pressure pump unit is introduced into the closed BOP assembly in a volume sufficient to cause the internal pressure within the closed BOP assembly to rise to the first pressure test level. Once the first pressure test level is established the high pressure pump system is isolated from the closed BOP assembly and the pressure is monitored, utilizing electronic or mechanical chart recorders, for a specified time period. During the monitoring phase the pressure decay is determined and compared to the pressure decay specification. A typical specification for compliance allows for a pressure decay rate of no more than 5 psi/minute or 25 psi total over the entirety of the five minute test. Measuring leak rate utilizing the indirect result of pressure decay, while widely accepted, is problematic and not indicative of a specific leak rate. Such factors as the compressibility, volume of the required intensification fluid, the amount of trapped air within the BOP assembly, and the flexibility of the BOP assembly have an effect on the relationship between the pressure decay rate and the actual leak rate. An example related to trapped air: if a typical land-based BOP assembly having an approximate test volume of 15 gallons and a volumetric loss rate of approximately 25 cc/min @ 250 psi is tested at 250 psi with approximately 7.5 gallons of air trapped within the BOP assembly during the monitoring phase of the hydrostatic test and then subsequently tested with approximately 2.5 gallons of air trapped within the BOP assembly during the monitoring phase of the hydrostatic test, the BOP would pass the first test with approximately a 3.2 psi/min pressure decay rate but, it would fail the second test with a 7.4 psi/min pressure decay rate. Each test would have the same volumetric loss rate of 25 cc/min but the result of the tests would be significantly different. In another example related to compressibility: if a typically BOP assembly, having 5 gallons of trapped air within the BOP assembly, and rig up configuration requiring approximately 50 gallons of a typical test fluid to conduct a high pressure (5000 psi) pressure decay test is first tested with a volumetric loss rate of approximately 3 cc/min, the resultant approximate psi/min decay rate will be 6.0 psi/min and the test would fail. If the same high pressure (5000 psi) pressure decay test is applied to the same typical BOP assembly but the rig up configuration requires approximately 100 gallons of a typical test fluid to conduct a pressure decay test and has the same 3 cc/min volumetric loss rate, then the approximate psi/min decay rate will be 3.0 psi/min and the test would pass. Each test would have the same volumetric loss rate and, related destructive energy, but the result of the tests would be significantly different. It is very important to realize that volumetric leak rate indicators, in conjunction with the pressure at which the leaks are occurring, are reliable indicators of the destructive energy dissipated across the leak paths, while psi/min decay rate indicators are not reliable indicators of the destructive energy dissipated across the leak paths. This is evident in the above example where in each test the pressure of the test and the volumetric loss rate are the same, and therefore so is the destructive energy, but the psi/min decay rate for each test is different and therefore not indicative of the destructive energy related to the leaks.

Thus there remains a need for a hydrostatic test method that provides for a means of directly correlating a psi/min decay rate to a measured leak rate when performing hydrostatic testing of BOP assemblies or other pressure vessels such as pipe lines and tanks.

BRIEF SUMMARY OF THE INVENTION

The present invention relates to a method for testing hydrostatic systems which includes determining the apparent compressibility factor of the fluid within the system which is then used to calculate a pressure decay rate for the system.

In the initial phase of pressurization, an Apparent Compressibility Factor (ACF) is determined as discussed below. When the BOP or fluid system is at the test pressure, the amount of intensifiying fluid needed to maintain the system at test pressure is measured over a time period and recorded. The psi/min decay rate based upon the ACF and the measured volume loss per time is then determined as discussed below. This decay rate is compared to the acceptable decay rate to see if the BOP or system passed the test. The time period for measuring the amount of intensifying fluid loss can be significantly lowered by using the ACF measurement which results in a considerable reduction in costs associated with the test.

BRIEF DESCRIPTION OF SEVERAL VIEWS OF THE DRAWINGS

For a detailed description of the preferred embodiments of the invention, reference will now be made to the accompanying drawings in which.

DETAILED DESCRIPTION OF THE INVENTION

Figure 1:
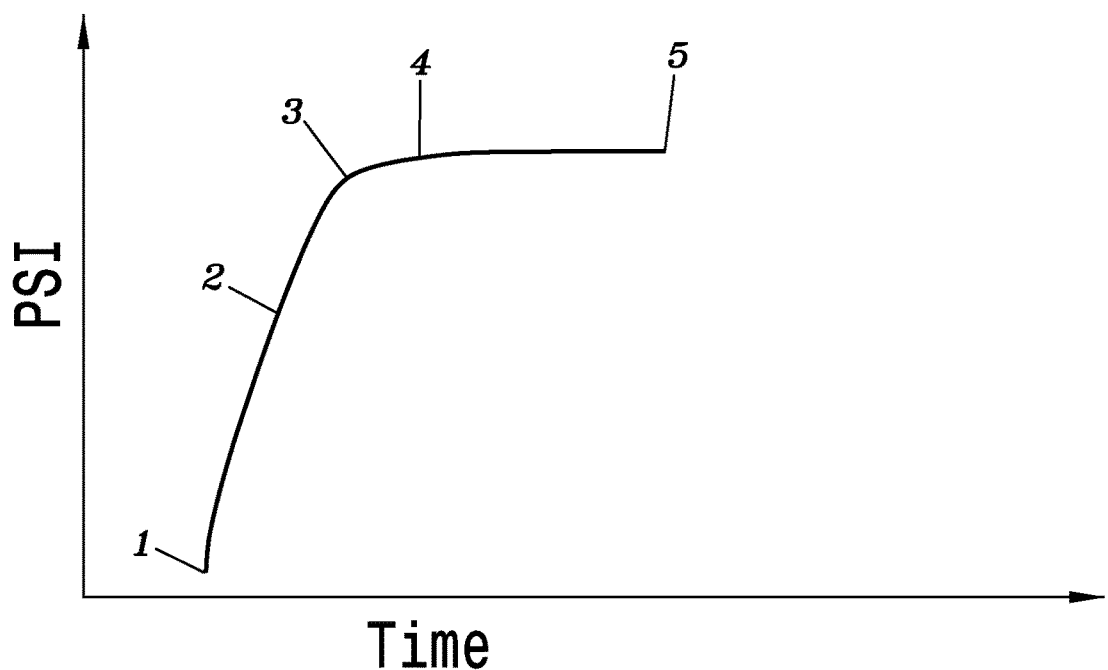
FIG. 1 is a graph of the pressure readings as a function of time in a leak test according to an embodiment of the invention.
Figure 2:
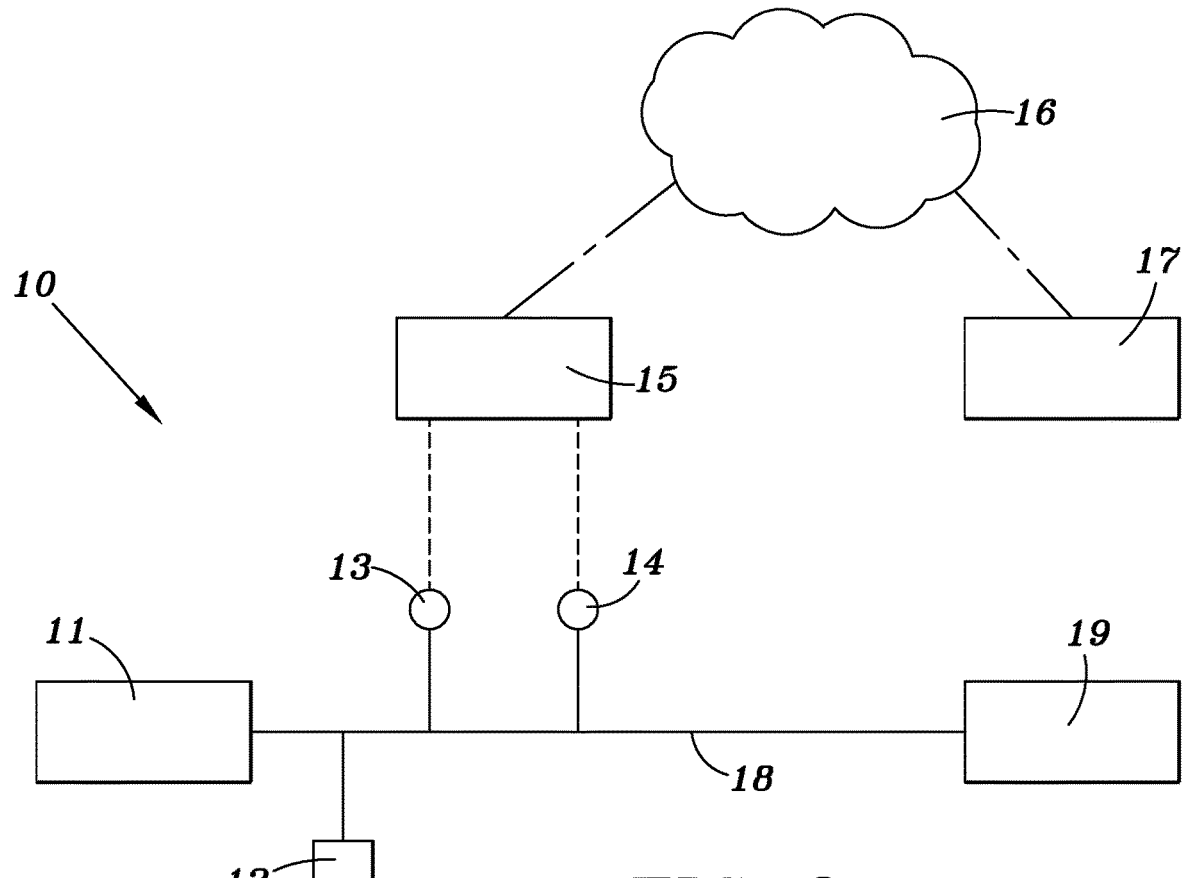
FIG. 2 is a diagram of apparatus suitable for carrying out an embodiment of the invention.

FIGS. 1 and 2 illustrates an embodiment of the test cycle. The pressure in the BOP or system 19 which may contain trapped air is raised from point 1 to point 4 as shown in FIG. 1. Point 4 represents the test pressure level. As the test pressure increases from point 3 to point 4, the incremental pressure change of the intensifying pressure is measured by a pressure sensor 13 and the incremental volume change of intensifying fluid is also monitored by a volume meter 14 positioned in flow conduit 18 which leads to BOP or system 19. During a typical test cycle an isolated area of the BOP which may include valves and safety devices is pressurized and volume rates and pressure of the intensifying fluid are recorded by the sensors 13 and 14. Thus information is sent to a computer processor 15.

The Apparent Compressibility Factor ACF is calculated by the following formula.

$$Va/PSIA = ACF$$

Where Va=Incremental volume change of intensifying fluid, PSIA=Incremental pressure change of the intensification pressure (psia), and ACF=Apparent Compressibility Factor.

When the BOP or system is pressurized to the test pressure level 4, the amount of intensifying fluid added in order to maintain the test pressure is measured over time (point 4 to point 5 of FIG. 1).

With this information, the equivalent psi/min decay rate can be calculated by the following formula: Vi/ACF=Pd. Where ACF=Apparent Compressibility Factor, Vi=volume loss rate (amount of fluid added to maintain constant pressure at test pressure), and Pd=equivalent decay rate in psi/minute.

With this method, a typical time period for a test run at about 250 psi is about 3 minutes as compared to about 10 minutes of the prior art.

Referring to FIG. 2, apparatus for carrying out an embodiment of the invention may include a computer processor 15 connected wirelessly or via hard wires to, and in electrical communication with, pressure sensor 13, and volume meter 14. Additionally, pressure sensor 13 and volume meter 14 are in fluid communication with BOP assembly 19 subject to the hydrostatic leak test. Sensor data from pressure sensor 13 and volume meter 14 is collected at a deterministic frequency to ensure time series data collection. During a typical BOP assembly hydrostatic test intensification pump 11 is placed in fluid communication with BOP assembly 19 via high pressure intensification line 18. Pressure sensor 13 and volume meter 14 may be integrated into one apparatus or may be configured separately. Both pressure sensor 13 and volume meter 14 are placed in fluid communication with BOP assembly 19 and are connected to computer processor 15. It is desirable for pressure sensor 13 to be placed in fluid communication with BOP assembly 19 as close as practical to BOP assembly 19. Additionally volume meter 14 and pressure sensor 13 are placed in electrical communication with computer processor 15. Chart recorder 12 is in fluid communication with BOP assembly 19. Computer processor 15 includes a computer program and a means of interacting with the computer program such as a keyboard, mouse or touch screen. The technician enters relevant information and process variables into the computer program of computer processor 15 pertaining to the immediately forthcoming hydrostatic test including the variable describing the maximum allowable psi/min decay rate and the hydrostatic intensification level (pressure level). The computer program can be initiated by the technician or automatically initiated when volume meter 14 senses flow of the intensification fluid. As the hydrostatic test is initiated and subsequently the intensification level reaches the intensification level previously specified by the technician, computer processor 15 samples both the pressure sensor 13 and the flow meter 14 within approximately the same deterministic time series. The just sampled values from pressure sensor 13 and volume 14 are processed by the computer program of computer processor to solve for the apparent compressibility factor by: Va/PSIA=ACF. Subsequently the computer program of computer process or 15 would utilize the just solved ACF number to calculate the equivalent psi/min decay rate by: Vi/AFC=Pd. The psi/min decay rate would then be compared to the allowable psi/min decay rate to determine if the system passed the pressure test. Computer processor 15 and the computer program can also be utilized to store a time stamped log of the entire test for off-site analysis and as a backup to chart record 12. Additionally computer processor 15 can be in communication with offsite location 17 via Internet, radio, cellular, and or other suitable information dissemination network 16.

The following is a hypothetical test of pressure testing a blowout preventer portion according to an embodiment of the invention.

For purpose of this test, the test pressure is 250 psi and it takes approximately 4.77 gallons of intensifying fluid from pump 11 to reach the test level pressure. This takes about 1 minute. Beginning at a pressure slightly lower than the test pressure (point 3 in FIG. 1) for example at 225 psi, the amount of fluid required to make a 1 psi change in pressure is calculated by the computer based upon the incremental volume change of the fluid and the incremental change of the intensification pressure which is measured by volume meter 14 and pressure sensor 13 respectfully.

In this test, assume that the apparent compressibility factor was determined to be 5.65 cc/psi. This part of the test could take as little as one second.

Immediately after reaching the test pressure (point 4 of FIG. 1), the amount of added intensification fluid/min required to maintain a constant test pressure at 250 psi is measured. This part of the test lasts for approximately 2 minutes (point 4 to point 5 of FIG. 1).

In this example, assume that the measured amount of fluid added per minute to maintain the constant test pressure is 16.96 cc/min.

Therefore the equivalent decay rate Pd=Vi/ACF would be 16.95/5.65 or 3.0 psi/min.

This number can be compared to the acceptable decay rate to determine if the blowout preventer portion has passed or failed the test.

Typical prior art leak rate tests described would require approximately seven additional minutes to complete the test. Thus a substantially savings in time is realized.

After the first test at 250 psi a second test can be done for example at 5000 psi in the same manner described above. The ACF would be calculated near the 5000 test pressure for example beginning at 4900 psi and the amount of fluid over time necessary to maintain the test pressure is measured for about two minutes. The decay rate in cc/min is then determined by the above formula for the decay rate and compared to the acceptable decay rate to determine if the blowout preventer portion passed or failed the test.

For pressure testing in the 250 psi range, it is desirable to calculate the ACF beginning at about 225 psi. For higher pressure testing, for example at 5000 psi the ACF can be determined as early as about 2500 psi, because the ACF doesn't change much after that. However, the closer the ACF determination is made to the test pressure, the more accurate the test results will be. The time interval for measuring the ACF can be as short as one second, or less.

The apparatus utilized to measure the volume of intensifying fluid added to increase the pressure a specified amount may be a simple totalizing flow meter, a stroke counter of a reciprocating pump, or something more precise such as a precision displacement measuring cylinder. The intensifying pump may be any suitable intensification pump including rotary and reciprocating positive displacement pumps. The pressure may be measured with a precision digital or analog pressure sensor or other suitable means that will provided the required precision and resolution. A typical computer, PDA, tablet, industrial processor, or any other device capable of performing basic logic and arithmetic functions could receive the volume and pressure information from the pressure and volume sensors to calculate the Apparent Compressibility Factor Although the present invention and its advantages have been described in detail, it should be understood that various changes, substitutions and alterations may be made herein without departing from the spirit and scope of the invention as defined by the appended claims.

What is claimed is:

1. A method of pressure testing a fluid handling system for leaks at a specified test pressure comprising;
    a) pressurizing the system to the test pressure by introducing pressure intensifying fluid under pressure into the system,
    b) measuring the system pressure at time intervals during the pressurizing of the system,
    c) determining an apparent compressibility factor of the system by calculating an amount of intensifying fluid required to raise the pressure of the system one psi,
    d) measuring an amount of added intensifying fluid required to maintain the system at the specified test pressure,
    e) determining an equivalent decay rate based on the apparent compressibility factor and the amount of added intensifying fluid, and
    f) comparing the equivalent decay rate to an acceptable decay rate to determine if the system passes the pressure test.

2. The method according to claim 1 wherein the apparent compressibility factor is determined by the following formula $$Va/PSIA=ACF$$

wherein ACF is the apparent compressibility factor, VA is an incremental volume change of intensifying fluid added as the pressure is increased to or near the test pressure and, PSIA is an incremental pressure change of the intensification pressure as the system is initially pressurized to the test pressure.

3. The method according to claim 2 wherein the equivalent decay rate is determined by the formula Pd=VI/ACF where Pd equals the equivalent decay rate, VI equals a volume loss rate for a given time period which is equal to the amount of added intensifying fluid required to maintain the test pressure for a given time period, and ACF is the previously calculated apparent compressibility factor.

4. The method of claim 1 wherein the fluid handling system is a blowout preventer for an oil/gas well.

* * * * *